US009003630B2

(12) United States Patent
Hufen

(10) Patent No.: US 9,003,630 B2
(45) Date of Patent: Apr. 14, 2015

(54) ASSEMBLY PLATE FOR HOUSING AT LEAST ONE MODULE IN A HOUSING BODY AND CORRESPONDING METHOD

(75) Inventor: Michael Hufen, Wuppertal (DE)

(73) Assignee: Dorma GmbH + Co. KG, Ennepetal (DE)

( * ) Notice: Subject to any disclaimer, the term of this patent is extended or adjusted under 35 U.S.C. 154(b) by 895 days.

(21) Appl. No.: 12/741,520

(22) PCT Filed: Nov. 13, 2008

(86) PCT No.: PCT/EP2008/009561
§ 371 (c)(1), (2), (4) Date: May 5, 2010

(87) PCT Pub. No.: WO2009/062699
PCT Pub. Date: May 22, 2009

(65) Prior Publication Data

US 2010/0258689 A1 Oct. 14, 2010

(30) Foreign Application Priority Data

Nov. 13, 2007 (DE) ......................... 10 2007 054 460
Nov. 13, 2007 (DE) ......................... 10 2007 054 462
Nov. 13, 2007 (DE) ......................... 10 2007 054 463
Nov. 13, 2007 (DE) ......................... 10 2007 054 464

(51) Int. Cl.
*F16M 13/02* (2006.01)
*E05F 15/10* (2006.01)
*E05F 3/10* (2006.01)
*E05F 15/12* (2006.01)

(52) U.S. Cl.
CPC . *E05F 15/10* (2013.01); *E05F 3/10* (2013.01); *E05F 15/12* (2013.01); *E05Y 2400/326* (2013.01); *E05Y 2400/334* (2013.01); *E05Y 2600/458* (2013.01); *E05Y 2800/205* (2013.01); *E05Y 2900/132* (2013.01)

(58) Field of Classification Search
CPC ................................................ E05Y 2600/458
USPC ............ 29/525.01, 464, 466, 469; 248/309.1, 248/309.2, 205.4, 220.21, 221.11, 222.14, 248/224.8
See application file for complete search history.

(56) References Cited

U.S. PATENT DOCUMENTS 4,858,878 A * 8/1989 Gassaway ..................... 248/551
6,098,264 A * 8/2000 Harrigan et al. ................ 29/464
6,536,731 B1 * 3/2003 Tegland ..................... 248/309.2
7,210,661 B1 * 5/2007 Jentzsch .................. 248/220.41
7,431,245 B2 * 10/2008 Smith et al. .................. 248/27.1

FOREIGN PATENT DOCUMENTS

| | | |
|---|---|---|
| DE | 20103270 | 5/2001 |
| DE | 20320657 | 11/2004 |
| DE | 202005000543 | 3/2005 |
| DE | 202007005265 | 6/2007 |
| EP | 1801339 | 6/2007 |

* cited by examiner

*Primary Examiner* — David Bryant
*Assistant Examiner* — Steven A Maynard
(74) *Attorney, Agent, or Firm* — Cozen O'Connor

(57) ABSTRACT

An assembly plate and a method for arranging at least one module in a housing body, including an assembly side for assembly in the housing body and an opposing module housing side for housing the module. According to the invention, the assembly plate has clip pins by means of which the module can be locked in a position on the assembly side as defined by the clip pins.

20 Claims, 3 Drawing Sheets

ASSEMBLY PLATE FOR HOUSING AT LEAST ONE MODULE IN A HOUSING BODY AND CORRESPONDING METHOD

PRIORITY CLAIM

This is a U.S. national stage of application No. PCT/EP2008/009561, filed on 13 Nov. 2008, which claims Priority to the following German, Application No(s).: 10 2007 054 460.1, filed: 13 Nov. 2007; 10 2007 054 462.8, filed: 13 Nov. 2007; 10 2007 054 463.6, filed: 13 Nov. 2007; and 10 2007 054 464.4, filed: 13 Nov. 2007; the contents of which are incorporated here by reference.

BACKGROUND OF THE INVENTION

1. Field of the Invention

The present invention relates to a mounting plate, for arranging at least one module at a reception body, having a mounting side to be mounted to the reception body and with an opposite module reception side for receiving the module.

2. Prior Art

A mounting plate is known from DE 20 2005 000 543 U1, which discloses at least one module formed by a door closer for actuating the dosing of a door leaf. The reception body may be formed by a wall, a door transom or by the door leaf itself, to which the mounting plate is affixed via the mounting side. The door closer is fastened to the mounting plate via the module reception side. As a consequence, firstly the mounting plate can be mounted to the reception body, to subsequently connect the door closer to the mounting plate via the module reception side. Disposing the door closer at the reception body is thereby simplified. However, mounting the module, which is exemplarily embodied as a door closer, to the mounting plate is very difficult for a mechanic. Very often the door closers are extremely heavy, in particular if the module to be affixed to the mounting plate is configured as a door operating device and includes a plurality of electrical and mechanical individual functions. Very often the mechanic needs to mount the door operating device at the door transom, such that the installation work needs to be performed overhead.

To dispose the module to be mounted, prior to the final mounting, for example prior to definitely screwing the module to the mounting plate, temporarily in a self-retaining manner, gooseneck-shaped clamping elements are known, which however, for releasing purposes, need to be pressed back out of their latching position by a special tool. In this case, the clamping elements need to be simultaneously moved back, wherein, when mounted close to an adjacent wall, in particular close to an adjacent ceiling, the clamping elements are not necessarily accessible. Thereby, the temporary mounting situation is additionally aggravated.

SUMMARY OF THE INVENTION

It is an object of the present invention to provide a mounting plate for receiving at least one module at a reception body, which overcomes the disadvantages of the aforementioned state-of-the-art and which makes mounting the module even easier.

According to one embodiment of the invention, the mounting plate has pilot pins, by which the module can be received and self-retainingly disposed on the module reception side in a position determined by the pilot pins.

The mounting plate with pilot pins offers the possibility to both, place the module on the mounting plate in a position determined by the pilot pins and to dispose the module self-retainingly on the module reception side of the mounting plate. On account of this advantageous further development of a mounting plate, a mechanic has the choice to place the at least one module to be disposed on the mounting plate in the right position on the latter such that subsequently the module remains self-retained in the given position. On account of the configuration of the holding elements as pilot pins, both positioning is provided and a repeated removal of the module from the mounting plate is easily possible, without having to use special tools or the like to manipulate further holding elements in often inaccessible positions.

According to one embodiment of, the mounting plate is formed from a sheet metal body, in a flat, preferably planar and oblong extension. The sheet metal body may be manufactured in a stamping-bending process and may have an essentially rectangular shape. In this case, the pilot pins may protrude approximately vertically from the mounting plate. Altogether four pilot pins may be provided, which are located in the area of the corners of the mounting plate. Receiving the module in the correct position on the mounting plate may be facilitated by disposing two pilot pins on the mounting plate. It is particularly preferred these two pilot pins be located at opposite corners of the mounting plate.

It is advantageous if the pilot pins have a cylindrical shape, a tapered shape or are configured preferably cone-shaped at their free end or have a tapered or truncated head. A rotation-symmetrical basic structure of the pilot pins helps to simplify the design of the counter-geometry configured in the module. On account of the cylindrical shape, the pilot pins are able to fulfil a guiding function, to guide the module into the correct position, when it is being placed onto the module reception side of the mounting plate. If the pilot pins have a tapered shape, a conically shaped or truncated end, respectively a cone shape, placing the module onto the pilot pins is easier, because centering is simplified.

In order to establish a latching that holds the module on the mounting plate, the pilot pins may comprise respectively at least one latching step, into which at least one latching nose, provided at the module, is latchable. The latching nose, provided at the module, may be located within a bore or at least within a bore-like reception in the module. If the module is placed onto the module reception side of the mounting plate, the pilot pins extend into the bore, respectively into the bore-like reception. The latching step may be configured in operative connection with the latching nose such that the latching nose may latch in the latching step like a snap lock, wherein however, when removing the module from the mounting plate, the latching connection can be non-destructively released. The latching step may be in particular tapered or cone-shaped or the latching nose has a triangular shape. The oblique extending surfaces formed thereby, allow for repeated releasing of the latching connection, without forming a non-releasable undercut between the latching step and the latching nose.

According to one embodiment, pilot pin reception portions are provided in the mounting plate by which the pilot pins can be attached in the mounting plate. The pilot pin reception portions may be configured as holes, in particular as through-openings within the mounting plate, such that the pilot pins are screwed, glued, pressed, welded, soldered or preferably riveted. If the pilot pins are releasably connected to the mounting plate by the pilot pin reception portion, the advantage is created for the mounting plate of being transportable separately from the pilot pins. If, however the pilot pins are already firmly connected to the mounting plate, for example by means of welding, soldering or riveting the pilot pin receptions to the mounting plate, the advantage is created that the expense of mounting the module to the reception body via the mounting plate is further reduced.

To further simplify introducing the pilot pins into the pilot pin holes in the modules, at the free end, remote from the mounting plate, the pilot pins may have a cone or at least one rounding or tapering. If the module is placed onto the pilot pins, introducing the pilot pins into the pilot pin holes is thus easier. In this case, the pilot pins preferrably comprise at least one cylindrical section such that, after introducing the pilot pins into the pilot pin holes, guiding and disposing the module in a precise position on the mounting plate is allowed.

For fastening the mounting plate to the reception body, the mounting plate has several reception holes, which are configured such that the fastening elements can be passed through the reception holes. The mounting plate has likewise several mounting holes for screwing the one, respectively more module(s) to the module reception side, wherein the fastening may be realized by fastening elements, which are for example screwable into the mounting holes. Both, the reception holes for fastening the mounting plate to the reception body and the mounting holes for mounting the one, respectively more module(s) to the mounting plate may present different fastening patterns. Depending on the shape of the reception body and in particular depending on the embodiment of the module to be mounted, different fastening patterns can be used. As a result, a universal mounting plate can be provided, which allows for arranging different modules on likewise different reception bodies.

According to one embodiment, the sheet metal body of the mounting plate may include at least one reinforcing bead. Preferably, the reinforcing bead may extend in the direction towards the longitudinal extension of the mounting plate and, in the sheet metal body, may achieve a preferably central depression, pointing in the direction of the mounting side. If the sheet metal body is formed by a comparably thin sheet metal material, both the reception holes and the mounting holes may be manufactured in the sheet metal body by plunging. If the reception holes are configured as a plunged rim hole for example, such that for example the countersunk head of a countersunk screw is receivable in the reception hole, the collar of the rim hole extends in the direction towards the mounting side of the mounting plate. The proposed central depression in the sheet metal body of the mounting plate may result in an elevation in the mounting plate, which corresponds to the height of the plunged collar for forming the reception hole. As a result, the reception holes are fitted in the area of the border of the sheet metal body, whereas the depression is located in the central area of the mounting plate. The mounting holes may be likewise manufactured in a plunging process, such that, in a further manufacturing step, a thread may be cut into the inner cylindrically section of the mounting holes.

According to one embodiment of the mounting plate, the modules constitute a fully automatic door operating device such that the mounting plate is configured to receive the door operating device, wherein the reception body is formed by a door transom, a door leaf, a wall or the like. At least one module may constitute a system carrier of the door operating device, wherein the pilot holes may be fitted into the system carrier. At least one other module may constitute a connector member for building an electrical connector device of the door operating device such that the pilot holes are fitted in the connector member as well. The modules may be connected to each other or individually placed onto the mounting plate.

Furthermore, the present invention relates to a door operating device with a mounting plate for arranging the door operating device at a reception body such as a door transom, a door leaf, a wall or the like.

Furthermore, the present invention is directed to a method for mounting a door operating device to a reception body, such as a door transom, a door leaf, a wall or the like. In this case, the mounting plate is utilized for arranging the door operating device at the reception body, wherein the method comprises at least the steps of arranging the mounting plate at the reception body via the mounting side, comprises furthermore placing the door operating device onto the module reception side of the mounting plate for a self-retaining arrangement of the door operating device on the mounting plate by means of pilot pins, and finally comprises also fastening the door operating device on the module reception side of the mounting plate by fastening elements. The method is furthermore improved in that, for placing the door operating device onto the mounting plate, associated latching noses are latched in latching steps provided at the pilot pins. Furthermore, after fastening the door operating device to the mounting plate, a cover plate may be placed onto the door operating device and, via latching recesses in the cover plate, it may be latched onto latching projections at the modules.

BRIEF DESCRIPTION OF DRAWINGS

Hereinafter, further measures enhancing the invention will be illustrated in detail in conjunction with the description of one preferred embodiment of the invention based on the Figures, in which.

DETAILED DESCRIPTION OF THE DRAWINGS

Figure 1:
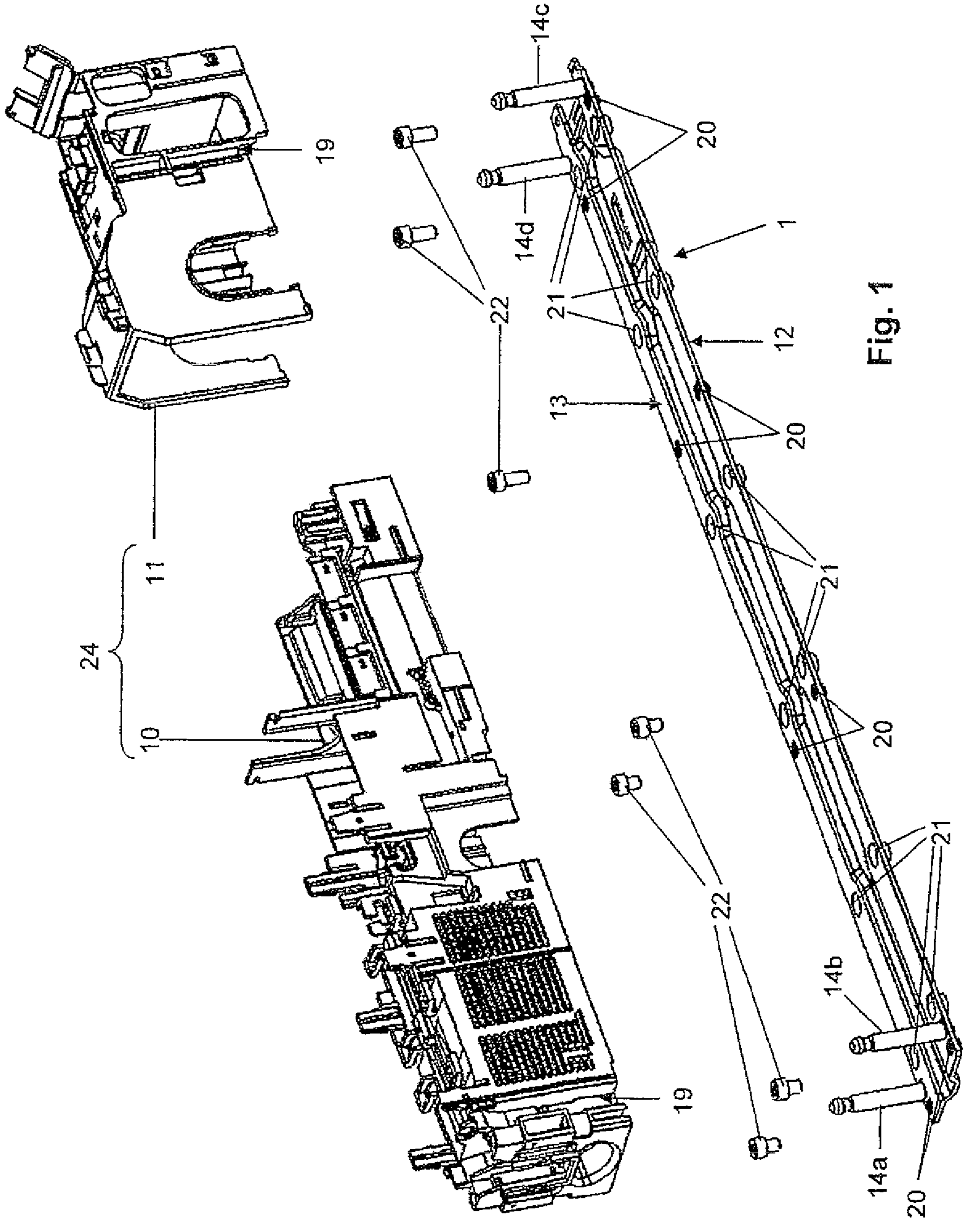
FIG. 1 is a perspective exploded view of the mounting plate with pilot pins, as well as modules, shown above the mounting plate, to be received on the mounting plate.

FIG. 1 is shows an embodiment of the inventive mounting plate 1 for arranging a module 10, as well as a module 11 at a reception body in a perspective view. The mounting plate 1 has a mounting side 12 which, according to the perspective illustration, corresponds to a bottom side of the mounting plate 1.

An upper side of the mounting plate 1 has a module reception side 13 for receiving the modules 10 and 11. Using fastening elements 22, the modules 10, 11 may be fastened to the mounting plate 1. For this purpose, the attachment screws 22 are screwed into corresponding reception holes 20.

Preferably, the mounting plate 1 has more reception holes 20 than the number of attachment screws 22 which are actually utilized. Thus reception holes 20 can be provided such that they are configured or disposed for being utilized in different combinations with the attachment screws 22, namely for a respective differently configured door operating device 24. A universally applicable mounting plate 1 is thus created. It is thereby possible to change from a door closer to a swing leaf operator, without requiring a new mounting plate 1, which otherwise would have resulted in uninstalling the old mounting plate and installing the new mounting plate at the aforementioned reception body and would run up the costs.

An installation comprises disposing the mounting plate 1 at a door transom, at a wall, or at a door leaf. This is preferably done in a usually known manner by screws and anchors. For passing these screws through mounting plate 1, the mounting holes 21 have respectively the shape of a countersunk hole.

According to the FIG. 1, four pilot pins 14*a*, 14*b*, 14*c* and 14*d* are located on the mounting plate 1, namely at the corners of the mounting plate 1 which is configured as a sheet metal body and has an oblong extension. The pilot pins 14*a* to 14*d* are configured as cylindrical pins and extend almost vertically above the module reception side 13 of the mounting plate 1.

When the modules 10 and 11, in this case illustrated as components of a door operating device 24 in a simplified manner, are placed onto the mounting plate 1, the pilot pins 14*a* to 14*d* extend into respective associated pilot pin holes 19, which are fitted into the modules 10 and 11 and have an opening which is oriented in the direction towards the mounting plate 1. The module 10 is preferably configured as a system carrier 10 of a door operating device, whereas the module 11, by way of example, corresponds to the connector member 11 of the door operating device.

Both the system carrier 10 and the connector member 11 may be placed simultaneously or consecutively onto the mounting plate 1, wherein the door operating device 24, constituted by the system carrier 10 and the connector member 11, is illustrated only by individual components and a drive module is not shown for the sake of clarity. The door operating device 24 can be in particular completely premounted, such that a single unit, comprising the system carrier 10 and the connector member 11, can be placed onto the mounting plate 1.

The door operating device 24 is thus immobilized in its position to a certain extent and can be finally fastened to the mounting plate 1. This is realized by means of screwing the attachment screws 22, which are accommodated in a captive manner in the module 10 and/or 11, without the mechanic having to simultaneously hold the door operating device 24 in position.

The pilot pins 14*a* to 14*d*, in conjunction with the corresponding recesses 19 in the modules 10, 11, thus allow the door operating device 24, once placed onto the free ends of the pilot pins 14*a* to 14*d*, when being pushed further towards the mounting plate 1, to be guided and automatically brought into the correct position. The pilot pins 14*a* to 14*d* are configured to be installed at the mounting plate 1 such that, when the door operating device 24 is in place, it is reliably retained, in particular if the mounting plate 1 is vertically installed at a door transom, for example.

Figure 2:
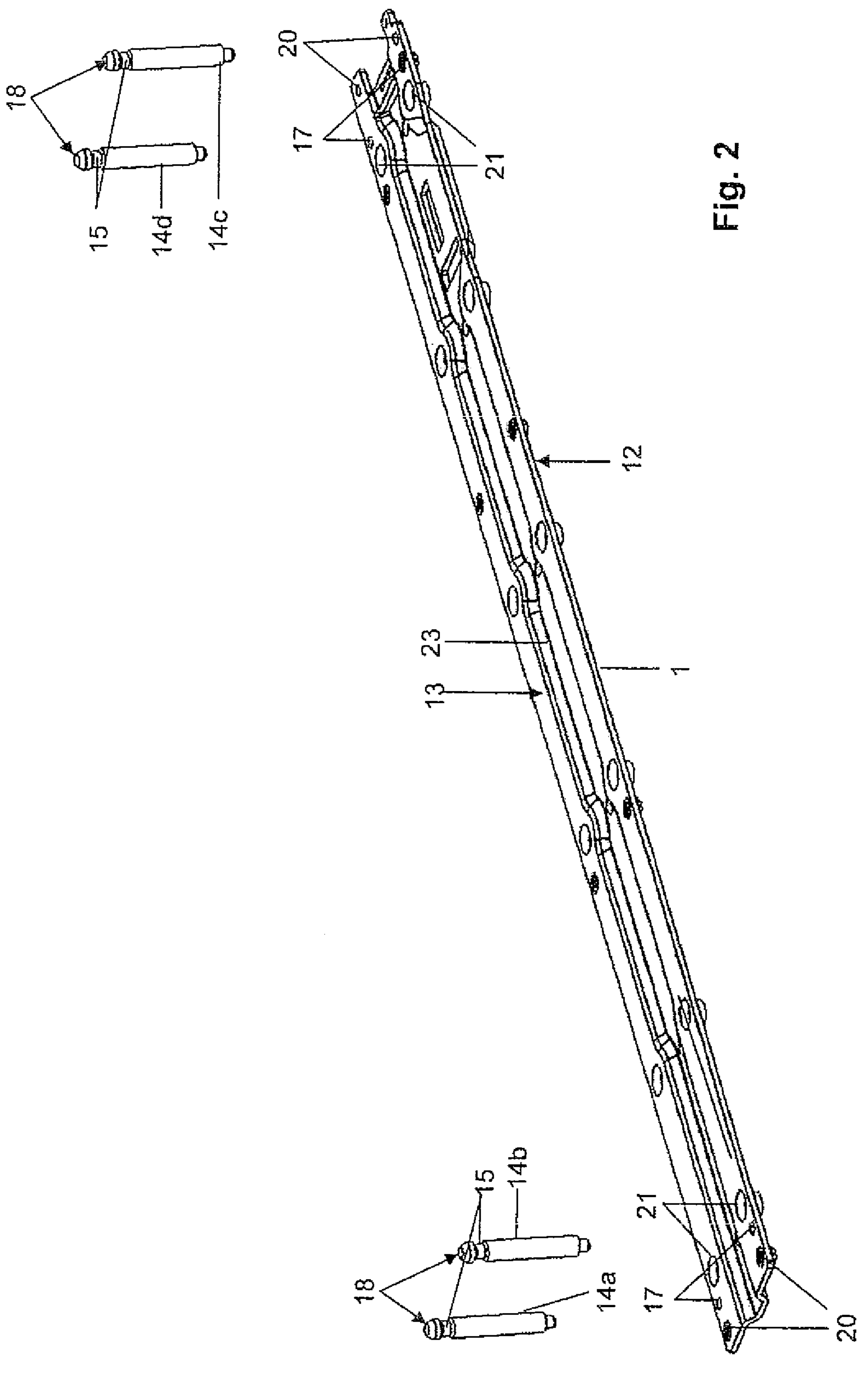
FIG. 2 is an enlarged perspective view of the mounting plate with pilot pins in a not joined condition

FIG. 2 is an enlarged view of the mounting plate 1 with the pilot pins 14*a* to 14*d* in an airborne disposition. The mounting plate 1 is preferably formed from a sheet metal body, which has been manufactured in a stamping-bending process. The sheet metal body has a rectangular shape with a flat, plane extension corresponding to the basic structure of the door operating device 24. The sheet metal body has an oblong shape, wherein a reinforcing bead 23 extends in longitudinal direction through the sheet metal body. A depression is formed by the reinforcing bead 23 such that the mounting plate 1 has two levels, wherein one level represents the mounting side 12, shown at the underside of the illustration, and a second level represents the module reception side 13 shown at the upper side of the illustrated mounting plate 1. The mounting plate 1 may be configured as well from an aluminium profile.

Instead of having the reinforcing bead 23, the mounting plate 1 may be formed as an essentially rectangular plate, and namely from steel for example.

The shown pilot pins 14*a* to 14*d* have respectively one latching step 15, which is illustrated as a surrounding groove in the pilot pins 14*a* to 14*d*, which, by way of example, are configured as cylindrical pins. On the side facing away from the mounting plate 1, the pilot pins 14*a* to 14*d* furthermore have a respective cone 18, which simplifies introducing the pilot pins 14*a* to 14*d* into the pilot pin holes 19 in the modules 10 and 11. The pilot pins 14*a* to 14*d* may be connected to the mounting plate 1 via pilot pin reception holes 17 in the mounting plate, wherein on the side facing the mounting plate 1, the pilot pins 14*a* to 14*d* have a shoulder, which can be inserted into the pilot pin reception holes 17 configured as holes 17, in order to rivet the pilot pins 14*a* to 14*d* in the holes 17.

Figure 3:
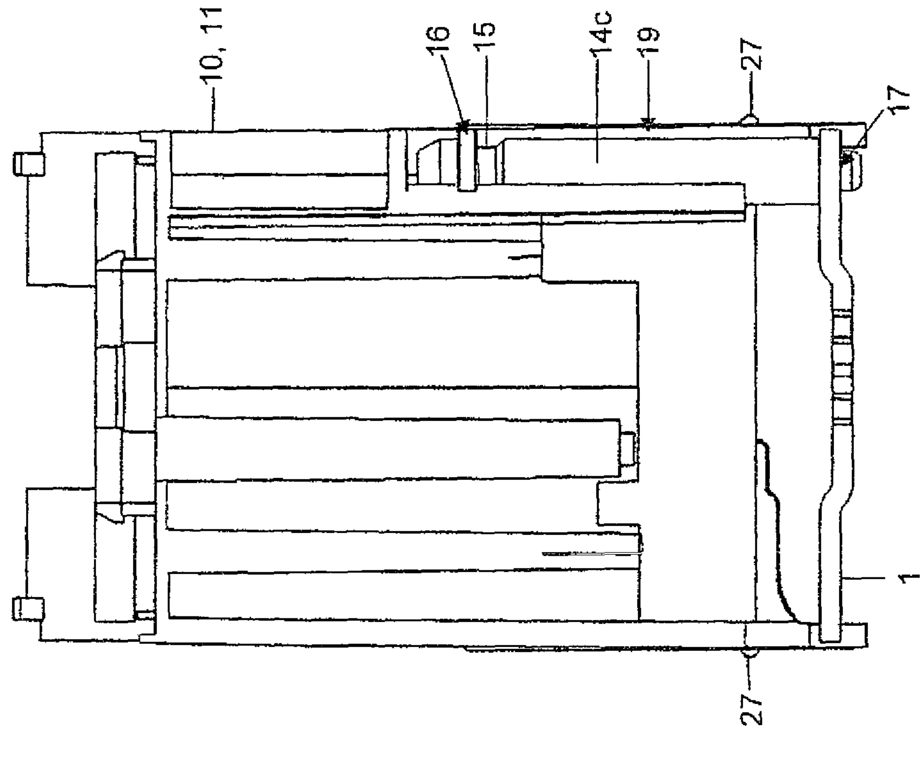
FIG. 3 is a cross-sectional view of the arrangement of a module on the mounting plate by a pilot pin.

FIG. 3 is a cross-sectional view of the module 10, 11 disposed on the mounting plate 1, wherein the self-retaining disposition of the module 10, 11 on the mounting plate 1 is simply realized via at least one pilot pin 14*c*. For holding the module 10 or 11 in a latching manner on the mounting plate 1, the pilot pin 14*c* extends into a pilot pin hole 19, which is fitted in the module 10 or 11. At the end of the pilot pin 14*c* remote from the mounting plate 1. Pilot pin 14*c* has the latching step 15, which is illustrated as a surrounding groove. A latching nose 16, which is illustrated only on one side and preferably may be provided as well on the side opposite the shown side, latches in the latching step 15. The latching nose 16 is resiliently introduced into the module 10 or 11, and can latch in the latching step 15 in such a way that a self-retaining disposition of the module 10 or 11 on the mounting plate 1 is made possible. Furthermore, the cross-sectional view shows the pilot pin 14*c* disposed in the mounting plate 1 via the pilot pin reception 17, which is illustrated as a hole 17. On the outside, the module 10 or 11 has two latching projections 27 in opposite disposition, which are provided for disposing and retaining a cover plate 25, which is shown in FIG. 4.

Figure 4:
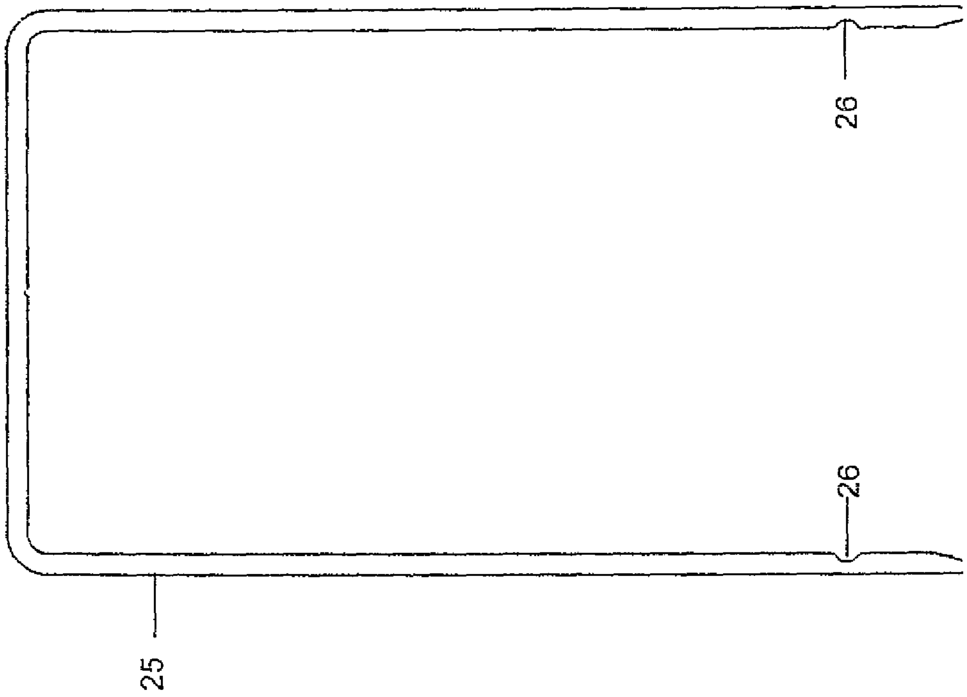
FIG. 4 is a lateral view of a cover plate with latching recesses fitted into the latter.

FIG. 4 shows a cover plate 25 for a latching disposition on the modules 10 or 11, according to FIG. 3. The cover plate 25 has a U-shaped cross-section, such that it can be put over the modules 10 or 11 with the open side of the U-shaped cross-sectional form. On the inside, the cover plate 25 has two latching recesses 26, in which the latching projections 27 of the modules 10 or 11 can latch according to FIG. 3.

The invention in its configuration is not limited to the above indicated preferred embodiment. On the contrary, a number of variants are conceivable, which make use of the described solution likewise with basically different types of executions. All features and/or advantages including the constructional details, spatial dispositions and process steps, resulting from the claims, the description or the drawings, may be essential to the invention, both by themselves and in their various combinations. In particular, the door operating device 24 may be built as a door operator according to an electro-mechanical or an electro-hydraulic configuration. Furthermore, the door operating device 24 may be configured as a simple door closer, which just has a spring force accumulator in order to automatically execute the closing movement of the door leaf. However, the idea of the present invention extends to a mounting plate 1 of a general species such that the modules 10 or 11 are not fundamentally components of a door operating device 24. The inventive mounting plate generally solves the problem to dispose a weight-loaded module 10 or 11 on a reception body, wherein initially a temporary self-retaining disposition in a precise position of the modules 10 or 11 at the reception body is allowed, in order to subsequently create a final, in particular load-absorbing connection for the modules 10 or 11 on the reception body. If the installation of the modules 10 or 11 on the reception body is done by a mechanic, the inventive mounting plate makes it easier to realize the final and in particular load-absorbing connection without having to simultaneously hold the module 10 or 11 on the mounting plate 1. As a consequence, the modules 10 or 11 may be formed from carrying profiles, which are intended for a ceiling installation and serve for guiding leaf elements, for example of a partitioning wall for a room.

Preferably the mounting plate 1 is provided with reception holes 20 such that they can be combined with differently configured door operating devices 24, namely door closers and/or swing leaf operators.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A door operating device in combination with a universal mounting plate, comprising:

- a door operating device including a plurality of apertures;
- a universal mounting plate configured to be installed on a reception body, the universal mounting plate adapted to receive the door operating device, wherein
  - a mounting side of the universal mounting plate is configured to be installed at the reception body;
  - an opposite reception side of the universal mounting plate is configured to receive the door operating device;
  - a plurality of fastening devices are configured to affix the universal mounting plate to the reception body; and
  - a plurality of pilot pins substantially vertically protrude from the reception side of the universal mounting plate and are configured to automatically guide, receive, and hold the door operating device on the reception side of the universal mounting plate in a mounted position, proscribed by the plurality of pilot pins, the pilot pins arranged rotation-symmetrical,
  - wherein the apertures of the door operating device are configured to receive respective pilot pins of the universal mounting plate to guide the door operating device into a desired position as the door operating device is placed onto the reception side of the universal mounting plate.

2. The combination according to claim 1, wherein the universal mounting plate comprises an essentially rectangular, flat sheet metal body, manufactured by a stamping-bending process.

3. The combination according to claim 2, wherein at least one reinforcing bead is provided in the sheet metal body of the universal mounting plate.

4. The combination according to claim 3, wherein the reinforcing bead extends in a longitudinal direction along the universal mounting plate and comprises a central depression pointing in the direction of the mounting side of the universal mounting plate.

5. The combination according to claim 3, wherein the reinforcing bead comprises a central depression pointing in the direction towards the mounting side of the universal mounting plate.

6. The combination according to claim 1, wherein four pilot pins are disposed on the universal mounting plate in the area of corners of universal mounting plate.

7. The combination according to claim 1, wherein each of the plurality of pilot pins comprise one of: a cylindrical shape, a tapered shape, or a conical or truncated head at their respective free ends, and wherein each of the plurality of pilot pins further comprises at least one latching step, upon which at least one latching nose, provided on the door operating device, can latch.

8. The combination according to claim 1, wherein latching receptions are provided in the universal mounting plate by which the pilot pins are received in the universal mounting plate.

9. The combination according to claim 5, wherein the pilot pins are one of screwed, glued, pressed, welded, soldered, or riveted in holes adapted as pilot pin receptions in the universal mounting plate.

10. The combination according to claim 1, wherein, the pilot pins have one of a cone or a rounding at the free end remote from the universal mounting plate for introducing the pilot pins into associated apertures of the door operating device.

11. The combination according to claim 1, wherein the universal mounting plate comprises a plurality of reception holes configured to fasten the universal mounting plate to the reception body by the plurality of fastening devices.

12. The combination according to claim 1, wherein the universal mounting plate comprises a plurality of mounting holes for stationarily fixing the door operating device on the reception side by the plurality of fastening devices.

13. The combination according to claim 1, wherein the universal mounting plate is configured to receive the door operating device, and the reception body is configured as a door transom, a door leaf, or a wall.

14. The combination according to claim 13, wherein the door operating device includes a system carrier, and the apertures.

15. The combination according to claim 14, wherein the system carrier has a connector member for forming an electrical connector device of the door operating device, wherein the apertures are formed in the connector member.

16. The combination according to claim 1, wherein the door operating device is adapted for connection to a door leaf via the universal mounting plate such that the door operating device can automatically open and close the door leaf.

17. The combination according to claim 16, wherein the door operating device is an electro-mechanical or electro-hydraulic drive unit configured as a door operator, for both an opening movement and a closing movement of the door leaf.

18. A method for mounting a door operating device to a reception body, the method comprising:

- providing a universal mounting plate configured to be installed on a reception body, the universal mounting plate adapted to receive a door operating device, wherein:
  - a mounting side of the universal mounting plate is configured to be installed at the reception body;
  - an opposite reception side of the universal mounting plate is configured to receive the door operating device;
  - a plurality of fastening devices are configured to affix the universal mounting plate to the reception body; and a plurality of pilot pins substantially vertically protrude from the reception side of the universal mounting plate and are configured to receive and hold the door operating device on the reception side of the universal mounting plate in a position, proscribed by the plurality of pilot pins, the pilot pins arranged rotation-symmetrical;

disposing the universal mounting plate at the reception body via the mounting side of the universal mounting plate, respectively via the fastening devices of the universal mounting plate;

fitting the door operating device onto the pilot pins from the reception side of the universal mounting plate by inserting the pilot pins into corresponding apertures in the door operating device, such that the door operating device is automatically guided and retained on the universal mounting plate by the pilot pins; and fastening the door operating device to the reception side of the universal mounting plate by the plurality of fastening devices.

19. The method according to claim 18, wherein the pilot pins include latching steps at the distal ends thereof and the door operating device includes corresponding latch noses, the method further comprising latching the latch noses of the door operating device with the latching steps of the pilot pins when fitting the door operating device on the reception side of the universal mounting plate.

20. The method according to claim 19, wherein following the step of fastening the door operating device to the reception side of the universal mounting plate, furthermore including the step of placing a cover plate onto the door operating device and latching the cover plate via latching recesses, which are configured in the plate, with latching projections configured on the door operating device.

* * * * *